United States Patent [19]

Strid

[11] Patent Number: 5,227,064
[45] Date of Patent: Jul. 13, 1993

[54] FILTER FOR CONTINUOUS FILTRATION
[76] Inventor: Kent Strid, Svadenvagen 11, S-810 28 Jarbo, Sweden
[21] Appl. No.: 603,662
[22] PCT Filed: Mar. 12, 1990
[86] PCT No.: PCT/SE90/00158
  § 371 Date: Oct. 7, 1991
  § 102(e) Date: Oct. 7, 1991
[87] PCT Pub. No.: WO90/10489
  PCT Pub. Date: Sep. 20, 1990
[30] Foreign Application Priority Data
  Mar. 13, 1989 [SE] Sweden ............... 8900880-9
[51] Int. Cl.$^5$ .................. B01D 33/00; B01D 33/06
[52] U.S. Cl. .................. 210/327; 210/402; 210/403; 210/404; 210/406; 210/416.1
[58] Field of Search ............... 210/327, 402, 403, 404, 210/406, 408, 416.1, 178, 741; 162/380

[56] References Cited
U.S. PATENT DOCUMENTS

| | | | |
|---|---|---|---|
| 3,698,556 | 10/1972 | Emmett, Jr. et al. | 210/178 |
| 3,744,543 | 7/1973 | Emmett, Jr. et al. | 210/741 |
| 4,168,234 | 9/1979 | Hutto, Jr. | 210/404 |
| 4,695,381 | 9/1987 | Ragnegard | 210/404 |
| 4,769,986 | 9/1988 | Kokkonen et al. | 210/404 |
| 4,929,355 | 5/1990 | Ragnegard et al. | 210/402 |
| 5,073,264 | 12/1991 | Immonen et al. | 210/404 |

FOREIGN PATENT DOCUMENTS

| | | |
|---|---|---|
| 1259571 | 9/1989 | Canada . |
| 275242 | 7/1986 | European Pat. Off. . |
| 939775 | 10/1961 | United Kingdom . |

Primary Examiner—Robert A. Dawson
Assistant Examiner—Ana M. Fortuna
Attorney, Agent, or Firm—Pollock, Vande Sande & Priddy

[57] ABSTRACT

A filter for continuous filtering of a suspension under pressure and/or vacuum comprises a vessel (1) having a center axle (2) on which filter discs (3) are arranged at a distance from each other along the central axle. The filter discs consist of filter sectors having surrounding filter cloth and internal channels and between the filter sectors and an outlet from the vessel (1) there is a connection in the central axle (2). Moreover, a scraper (7) is arranged for removing the filter cake (8) on the filter cloth obtained during the filtering operation and a vertical outlet pipe (12) receives the scraped-off filter cake material. The central axle (2) is formed with only one common channel for the filtrate and the gas from all filter sectors in the vessel (1) and consists of a tube.

9 Claims, 1 Drawing Sheet

FILTER FOR CONTINUOUS FILTRATION

FIELD OF THE INVENTION

The present invention relates to a filter for continuous filtering of a suspension The filtering takes place under pressure or under vacuum or under a combination of pressure and vacuum.

BACKGROUND OF THE INVENTION

As previously known, the filter includes a vessel containing the suspension to a certain level and a gas space positioned above the suspension, an essentially horizontal center axle rotatably arranged in the vessel, filter discs spaced from each other along the center axle and substantially perpendicular to the latter, the filter discs consisting of filter sectors with surrounding filter cloth and internal channels for filtrate and gas obtained during the filtering, connection means in the center axle between the filter sectors and an outlet from the vessel, removing means for each filter disc arranged in the gas space for the removal of filter cake obtained on the filter cloth during filtering, and means for receiving the filter cake material removed by the removing means.

It is known to use as the removing means in such filters a so-called doctor, i.e., a scraper or cutter principally in the form of a planer. The scraper is arranged immediately above the suspension level where the filter sectors descend into the suspension, i.e., at the end of the rotation of the filter sectors in the gas space. In these filters, the scrapers are therefore positioned substantially horizontally. Such positioning of the scrapers, however, results in several disadvantages. Scraped-off material tends to shuffle over the scraper with accompanying risk of deposits on the scraper. Moreover, this positioning of the scraper limits the utilization of the filtering surfaces of the filter discs, since the suspension level in the filter vessel can be no higher than the position for the scraper. The positioning of the scrapers furthermore means that the receiving device must be formed relatively wide, at least in its upper part, and then taper downwardly to a circular outlet. This results in a relatively large distance between the filter discs. Furthermore, there is a great risk that scraped-off material is built up in the downwardly directed cone from rectangular cross-section at the scrapers to circular cross-section at the discharge of scraped-off material through the bottom of the vessel.

By the present invention, the above disadvantages have been eliminated. In applicant's filter, the removing means consists of an substantially vertically arranged scrape for removing at least an outer layer of the filter cake along a substantially vertical line for substantially vertically sliding and dropping down of the scraped-off filter cake material along the scraper. As a result of this positioning of the scraper, scraped-off material tends to slide along the scraper without drag and to drop therefrom. The scraper is accordingly not under load. Moreover, the scraped-off material falls in a controlled, substantially hour-glass form. Furthermore, the risk of build-up is eliminated, in contrast to what happens in the case of horizontally positioned scrapers. Another advantage, with the positioning of the scrapers according to the invention, is that the suspension level in the filter can be raised drastically so that the filtering surface can be optimally used, resulting in high and optimal capacity for each filter disk. Another advantage is that positioning of the scrapers according to the invention results in a filter construction having considerably less distance between the filter disks on the center axle; this permits a substantially smaller filter dimension for the same capacity.

Preferably, the scraper is so inclined that the lower end of the scraper is further away from a vertical plane through the center axle than the upper end of the scraper. Such positioning further facilitates dropping of scraped-off filter cake material off the scraper.

In a preferred embodiment, the receiving device consists of a substantially vertically arranged outlet pipe. Due to the form of a vertical scraper, this outlet pipe below the scraper can have a diameter smaller than corresponding receiving devices in prior art filters, and it need not be conical. This helps to make it possible to reduce the distance between the filter discs.

Preferably, only an outer layer of the filter cake on the filter cloth is removed by the scraper during each revolution for the filter discs and the remaining layer, called precoat layer, augments the filter cloth as filter In time, this precoat layer becomes too tight and must be removed. Conventionally, the entire precoat layer is blown off by blowing air into one of the channels in the center axle via a filtrate valve arranged at the outlet end of the axle, causing the entire precoat layer from a sector to fall off the filter cloth. As a result, a large amount of filter cake drops at the same time down into the tapered receiving devices, causing a great risk of clogging The internal blowing also causes the sector cloths to be blown up immediately upstream of the scraper, resulting in great risk for the cloth to be damaged by the scraper. Moreover, the blow-off of the precoat layer is uncontrolled since the blown gas rushes through the filter cloth where it can pass most easily, i.e., where the layer first releases the gas, and accordingly leaves certain sector cloths unblown. In a preferred embodiment of the invention, there is also a device for intermittent removal of the precoat layer, and this device is positioned above the receiving device preferably formed as an outlet pipe and alongside the substantially vertical scraper. The precoat removal is preferably carried out by a substantially vertically positioned spray pipe for high pressure washing. The spray pipe is positioned immediately upstream of the scraper, and the wash liquid is supplied to the wash pipe through a separate conduit. This arrangement allows controlled flushing, and flush-off material falls in a controlled manner and in a lesser amount per unit of time down in to the receiving device, compared with the above-mentioned blowing of the precoat layer in the prior art. In other words, intermittent removal of the precoat layer in accordance with the present invention removes only the material that at the moment is fed to the removal device, i.e., a small layer per unit of time. Nor is there any risk that the cloth will be damaged by the scraper when using the removal technique according to the invention. The specified shape and positioning of the removal device also contributes to the compact construction of the filter.

The present invention also utilizes a prior art device for intermittent washing of the filter cloth. According to a preferred embodiment of the invention, the device for intermittent removal of the precoat layer and the device for intermittent washing are one and the same device; this is obviously advantageous.

In prior art filters of the kind described hereinabove, the connection in the center axle between the filter sectors and the outlet from the vessel consists of a number of channels corresponding to the number of disk sectors. When the number of disk sectors is, for instance, twenty, as is often the case, there are twenty channels in the center axle, so that the center axle must have a relatively large diameter, and the construction is complicated and expensive. According to the invention, the connection in the center axle between the filter sectors and the outlet consists of one common channel for the filtrate and the gas from all filter sectors in the pressure vessel, and the center axle preferably consists of a tube. This reduces the cost of manufacture for the center axle, which also can be made with a considerably smaller diameter.

Configuration of the center axle as a tube provides a further advantage. In a preferred embodiment of the invention, a filtrate separator is, in a manner per se, connected to the outlet of the pressure vessel and arranged for separating filtrate and gas. In prior art filters, there are sealing problems in the transition section from the center axle. In the past, this transition section has been obtained with a so-called filtrate valve having a wearing disk as a seal between the rotating center axle and the outlet pipe to the filtrate separator. When the filtrated liquid which flows in the channels through the outlet is fairly clean, it produces less wear in the center of the wearing disc and the axle, while the outer part of the seal is subjected to unfiltered medium which forces its way between the sealing surfaces and wears the sealing element at the periphery. For this reason, it has been necessary to replace the wear disk rather frequently and there has been a substantial risk of wear of the end of the center axle. Moreover, the transition section from rotating axle to stationary tube is complex and expensive.

These disadvantages have been eliminated in a preferred embodiment of the invention, in which the center axle is a tube, and the connection between the vessel outlet and the filtrate separator the separator is provided with a tube having a dimension corresponding to the center tube of the vessel, and a coupling including a seal is provided for interconnection of the tubes. Such a connection is not only cheaper than the prior art filtrate valve, but also presents no sealing problems.

In addition to the above-mentioned advantages, the filter according to the invention also provides the advantages that:

the number of filter sectors is limited to what can be inserted into the filter via the openings for the assembly;

a small number of filter sectors and filter discs reduces manufacturing and assembly errors;

more straight filter sectors can be manufactured;

filtering can continue for a longer time since the scraper can come closer to the filter disc without any risk that it will grip in and damage the filter cloth;

the precoat layer need not be changed as often, resulting in longer operation times;

since the precoat layer is thinner, it is also easier to remove;

lower manufacturing costs;

lower maintenance costs;

less shut-down time;

the diameter of the filter discs can be decreased with maintained filtering surface, owing to the fact that the center axle has a smaller diameter;

the filtering surface of the filter discs can be used optimally since the suspension level can be raised in the filter vessel;

maximum capacity per installed filter surface is achieved;

the volume of the filter, compared to prior art filters of at least as large a capacity, can be made smaller and at lower cost; for example, the distance between filter discs can be decreased by about 35% with a correspondingly shorter center axle, the diameter of the vessel can be reduced by about 15% and the diameter of the filter discs by about 12%; and a smaller vessel means that thiner plate can be used for the vessel, and that less maintenance time with less risk for sedimentation in the vessel is needed.

BRIEF DESCRIPTION OF THE DRAWINGS

The invention will now be described in more detail with reference to accompanying drawings, wherein.

DETAILED DESCRIPTION

Figure 1:
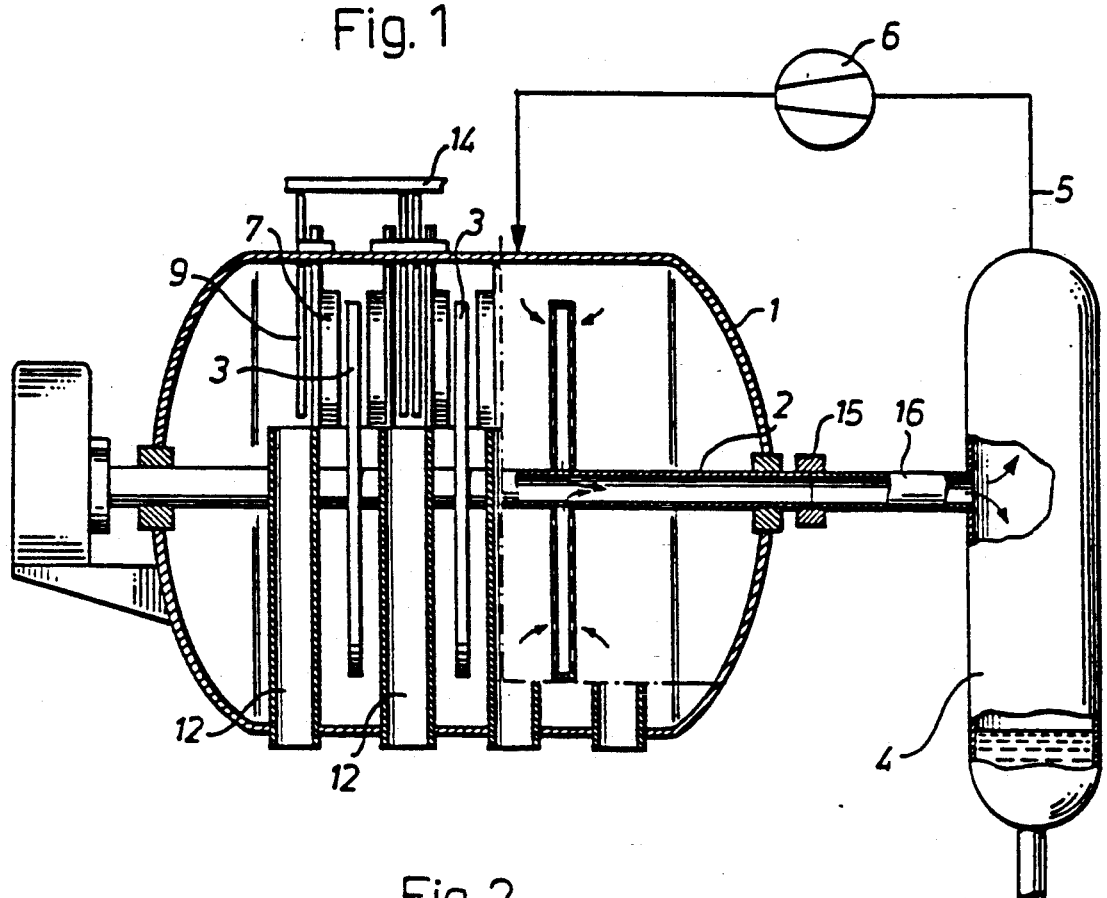
FIG. 1 is a side view, partly in section, of a filter according to the invention.
Figure 2:
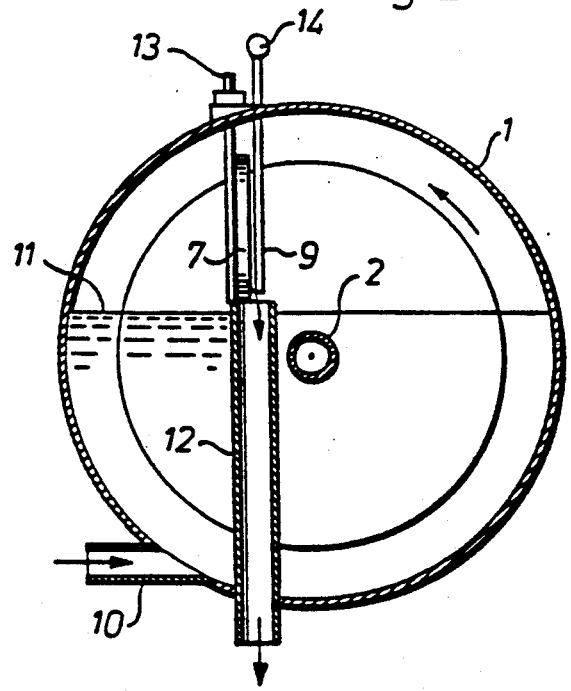
FIG. 2 is a vertical section of the filter.

The pressure filter shown in the drawing, like prior art pressure filters, comprises a substantially cylindrical pressure vessel 1, a center axle 2 rotatably journaled in the pressure vessel and a number of filter discs 3 arranged at a distance from each other on the center axle. Each filter disc consists of a number of disc sectors (not shown), having a configuration as shown, e.g., in U.S. Pat. No. 4,695,381. As usual, the filter sectors consist of a surrounding filter cloth and interior channels which are connected to the center axle for discharging the filtrate and gas obtained during the filtering operation to filtrate separator 4 for separating filtrate and gas. The gas is returned to the pressure vessel 1 via gas conduit 5 provided with a compressor 6. Moreover, the filter includes a removal device or scraper 7 for removing the filter cake 8 (see FIG. 3) obtained on the filter cloth during the filtering operation, a device for removing filter cake material located underneath scraped-off filter material, i.e., the so-called precoat layer, a device 12 for receiving the removed filter cake material and a device for washing the filter cloth. The filter vessel also comprises an inlet 10 for supplying suspension and maintaining the suspension at a certain level 11 in the pressure vessel.

The pressure vessel shown in the drawings has, however, a number of essential distinctions compared with prior art filters.

Thus, for scraping the filter cake off the filter cloth during the filtering operation, the scraper 7 is substantially vertically arranged in the gas space above the suspension level, so that scraped-off material falls in a controlled manner from the scraper and does not load the scraper, and the risk for scraped-off material to be built up on the scraper is eliminated. The scraper is preferably inclined somewhat outwardly with respect to center axle 2. The receiving device 12 for the scraped-off material consists of a vertical cylindrical tube having a smaller diameter than prior art known receiving devices formed with a cone, thereby obviating the risk of build-up of scraped-off material in the receiving device. This positioning of the scraper and the cylindrical tube shape of the receiving device means that the distance between the filter discs can be reduced, e.g., by about 35%. The positioning of the scraper also means that the suspension level in the filter can be raised, whereby the filtration surface can be used optimally.

Figure 3:
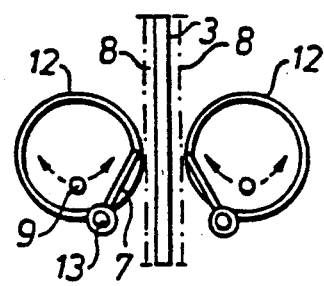
FIG. 3 shows in larger scale a top plan view of certain element included in the filter.

As shown in FIG. 3, the scraper 7 is adjustable about an axle 13.

With the filter configuration according to the invention, removal of the precoat layer and washing of the filter cloth can be carried out in an advantageous manner. A substantially vertically arranged removing device combined with a washing device is in the form of a spray tube 9 arranged upstream of the scraper in the rotational direction of the filter discs and above the outlet pipe 12. The spray tube receives spray liquid from conduit 14. Sprayed-off material thereby drops in a controlled manner down into the outlet pipe 12, in a predetermined quantity per unit of time. Moreover, the risk that the filter cloth on the filter discs will be damaged by the scraper is eliminated; in prior art filters removal of the precoat layer is achieved by blowing from inside outwardly through the filter cloth.

Another essential novelty in the filter according to the invention is that the center axle consists of only one common channel for filtrate and gas from all filter sectors in the pressure vessel, as distinguished from prior art filters where the filter axle was formed with a channel from each filter sector. As shown in the drawings, the center axle consists of only one cylindrical tube with connections to the filter sectors. Besides a considerably simpler construction and lower manufacturing costs, simpler and more reliable connection 15 to the filtrate separator 4 is obtained, compared with the comparatively complicated filtrate valves which are arranged at center axles formed with several channels in prior art filters. The connection 15 is normally positioned outside the filter vessel adjacent the vessel, but can also be positioned at another location, e.g., inside the filter vessel. The connection 15 between the rotating center tube 2 and a tube 16 connected to the filtrate separator 4 is simple in construction and permits simple sealing, preferably mechanical sealing. The center axle can be manufactured with considerably less diameter than prior art center axles including a number of channels.

While a filter for continuous filtering under pressure has been shown in the drawings and described above, the filter may also be a vacuum filter, and be constructed for filtering during both pressure and vacuum.

I claim:

1. A filter for continuous filtering of a suspension under pressure and/or vacuum, comprising a vessel for said suspension and gas in a space above said suspension, said vessel having an inlet for suspension and an outlet for filtrate obtained during filtration, a substantially horizontal central axle rotatable arranged in said vessel, filter discs spaced along said central axle and consisting of filter sections having surrounding filter cloth and internal channels for filtrate and gas obtained during filtration, communicating means in said central axle between said filter sectors and said outlet, removal means for each filter disc arranged in said gas space for removing filter cake material deposited on said filter cloth during said filtration, and means for receiving filter cake material removed by said removal means, wherein said removal means comprises a scraper for removal of at least an outer layer of said filter cake, said scraper extending in a vertical direction and having an upper end and a lower end, said lower end being positioned at a greater distance from a vertical plane through said central axle than said upper end.

2. A filter according to claim 1, wherein said receiving means consists of a substantially vertically arranged outlet pipe.

3. A filter according to claim 1, further including intermittently operating removal means located in said gas space above said receiving means and laterally of said scraper for removal of an inner layer of said filer cake material deposited on said filter cloth closer thereto than said outer layer.

4. A filter according to claim 3, wherein said intermittently operating removal means comprises means for intermittent washing of said filter cloth.

5. A filter according to claim 4, wherein said means for intermittent washing comprises a substantially vertically arranged spray tube for high pressure spraying.

6. A filter according to claim 3, wherein said intermittently operating removal means is arranged immediately upstream of said scraper as seen in the rotational direction of said filter discs.

7. A filter according to claim 1, wherein said communicating means consists of one common channel for said filtrate and said gas from all of sad filter sectors.

8. A filter according to claim 1, further including a separator connected to said outlet for separating filtrate and gas.

9. A filter according to claim 8, wherein said central axle is a tube having a predetermined dimension, and wherein said separator is provided with an inlet tube having a dimension corresponding to said predetermine dimension, said tube and said inlet tube being interconnected by means of a coupling including a seal.

* * * * *